(12) United States Patent
Anastas et al.

(10) Patent No.: US 7,982,711 B2
(45) Date of Patent: Jul. 19, 2011

(54) HAPTIC PROFILING SYSTEM AND METHOD

(75) Inventors: George V. Anastas, San Carlos, CA (US); Michael D. Levin, Los Altos, CA (US); Danny Grant, Montreal (CA); Juan Manuel Cruz-Hernandez, Montreal (CA); Pedro Gregorio, Montreal (CA); Christophe Ramstein, San Francisco, CA (US)

(73) Assignee: Immersion Corporation, San Jose, CA (US)

(*) Notice: Subject to any disclaimer, the term of this patent is extended or adjusted under 35 U.S.C. 154(b) by 1454 days.

(21) Appl. No.: 11/014,218

(22) Filed: Dec. 17, 2004

(65) Prior Publication Data
US 2005/0184696 A1   Aug. 25, 2005

Related U.S. Application Data

(60) Provisional application No. 60/531,416, filed on Dec. 19, 2003, provisional application No. 60/551,054, filed on Mar. 9, 2004.

(51) Int. Cl.
*G09G 5/00* (2006.01)

(52) U.S. Cl. ............... 345/156; 345/161; 318/568.17

(58) Field of Classification Search .......... 345/156–169, 345/418–419; 318/567, 568.1, 568, 568.17
See application file for complete search history.

(56) References Cited

U.S. PATENT DOCUMENTS

| | | | |
|---|---|---|---|
| 5,388,992 A | 2/1995 | Franklin et al. | |
| 5,435,729 A | 7/1995 | Hildreth et al. | |
| 5,629,594 A | 5/1997 | Jacobus et al. | |
| 5,649,020 A | 7/1997 | McClurg et al. | |
| 5,684,722 A | 11/1997 | Thorner et al. | |
| 5,691,898 A | 11/1997 | Rosenberg et al. | |
| 5,701,140 A | 12/1997 | Rosenberg et al. | |
| 5,709,219 A | 1/1998 | Chen et al. | |
| 5,731,804 A | 3/1998 | Rosenberg | |
| 5,742,278 A * | 4/1998 | Chen et al. | 345/156 |
| 5,802,353 A | 9/1998 | Avila et al. | |
| 5,808,601 A | 9/1998 | Leah et al. | |

(Continued)

OTHER PUBLICATIONS

MacLean, K., "The 'Haptic Camera': A Technique for Characterizing and Playing Back Haptic Properties of Real Environments", Proceedings of the 5th Annual Symposium on Haptic Interfaces for Virtual Environments and Teleoperator Systems, ASME/IMECE, DSC—vol. 58, Atlanta, GA, Nov. 1996.

(Continued)

*Primary Examiner* — Quan-Zhen Wang
*Assistant Examiner* — Mansour M Said
(74) *Attorney, Agent, or Firm* — Squire, Sanders & Dempsey (US) LLP (57) ABSTRACT

An apparatus includes a characterization module configured to receive data associated with operational characteristics of a mechanical device, the operational characteristics being associated with a perceptual experience of the mechanical device. A conversion module is coupled to the characterization module. The conversion module is configured to automatically produce, substantially without user intervention, a parametric data set associated with the mechanical device based on the data. In another embodiment, a method includes receiving data associated with operational characteristics of a mechanical device. The operational characteristics are associated with a perceptual experience of the mechanical device. A parametric data set associated with the mechanical device is produced automatically, without user intervention. The parametric data set is associated with the mechanical device based on the data.

28 Claims, 3 Drawing Sheets

U.S. PATENT DOCUMENTS

| | | |
|---|---|---|
| 5,828,197 A | 10/1998 | Martin et al. |
| 5,844,392 A | 12/1998 | Peurach et al. |
| 5,877,748 A | 3/1999 | Redlich |
| 5,952,806 A | 9/1999 | Muramatsu |
| 5,956,040 A | 9/1999 | Asano et al. |
| 5,956,484 A | 9/1999 | Rosenberg et al. |
| 5,959,613 A | 9/1999 | Rosenberg et al. |
| 5,973,670 A | 10/1999 | Barber et al. |
| 5,973,689 A | 10/1999 | Gallery |
| 5,999,185 A | 12/1999 | Kato et al. |
| 6,005,551 A * | 12/1999 | Osborne et al. ............... 345/161 |
| 6,020,876 A | 2/2000 | Rosenberg et al. |
| 6,028,593 A | 2/2000 | Rosenberg et al. |
| 6,036,495 A | 3/2000 | Marcus et al. |
| 6,057,828 A | 5/2000 | Rosenberg et al. |
| 6,078,308 A | 6/2000 | Rosenberg et al. |
| 6,084,587 A | 7/2000 | Tarr et al. |
| 6,111,562 A | 8/2000 | Downs et al. |
| 6,131,097 A | 10/2000 | Peurach et al. |
| 6,147,674 A | 11/2000 | Rosenberg et al. |
| 6,161,126 A | 12/2000 | Wies et al. |
| 6,169,540 B1 | 1/2001 | Rosenberg et al. |
| 6,219,032 B1 | 4/2001 | Rosenberg et al. |
| 6,219,034 B1 | 4/2001 | Elbing et al. |
| 6,252,579 B1 | 6/2001 | Rosenberg et al. |
| 6,252,583 B1 | 6/2001 | Braun et al. |
| 6,285,351 B1 | 9/2001 | Chang et al. |
| 6,292,170 B1 | 9/2001 | Chang et al. |
| 6,292,174 B1 | 9/2001 | Mallett et al. |
| 6,326,964 B1 | 12/2001 | Snyder et al. |
| 6,424,356 B2 | 7/2002 | Chang et al. |
| 6,433,771 B1 | 8/2002 | Yocum et al. |
| 6,437,771 B1 | 8/2002 | Rosenberg et al. |
| 6,750,877 B2 | 6/2004 | Rosenberg et al. |
| 6,859,819 B1 | 2/2005 | Rosenberg et al. |
| 6,876,891 B1 | 4/2005 | Schuler et al. |
| 7,091,950 B2 | 8/2006 | Rosenberg et al. |
| 7,307,619 B2 * | 12/2007 | Cunningham et al. ........ 345/163 |
| 2003/0006892 A1 | 1/2003 | Church |
| 2003/0067440 A1 * | 4/2003 | Rank ............................ 345/156 |
| 2003/0076298 A1 | 4/2003 | Rosenberg |
| 2004/0227727 A1 * | 11/2004 | Schena et al. ................. 345/156 |
| 2005/0066969 A1 * | 3/2005 | Rick et al. ................ 128/204.18 |

OTHER PUBLICATIONS

Aliaga, Daniel G., "Virtual Objects in the Real World", Communications of ACM, vol. 40, No. 3, Mar. 1997, pp. 49-54.

Hac, Anna et al., "Synchronization in Multimedia Data Retrieval," International Journal of Network Management, vol. 7, 1997, pp. 33-62.

Iwata, Hiroo, "Artificial Reality With Force-Feedback: Development of Desktop Virtual Space With Compact Master Manipulator," Computer Graphics, vol. 24, No. 4, Aug. 1990, pp. 165-170.

Jones, L. A. et al., "A Perceptual Analysis of Stiffness," 79 Experimental Brain Research No. 1, pp. 1990, 150-156.

MacLean, Karon E. et al., "An Architecture for Haptic Control of Media," in: The Proceedings of the ASMA Dynamic Syatems and Control Division: 1999 International Mechanical Engineering Congress and Exposition, Eighth Annual Symposium on Haptic Interfaces for Virtual Environment and Teleoperator Systems, Nov. 14-19, 1999, pp. 1-10.

Minsky, Margaret et al., "Feeling and Seeing: Issues in Force Display," Dept. of Computer Science, 1990, pp. 235-242, 270.

Ouh-Young, "Force Display in Molecular Docking," Doctoral Disertation. Unversity of North Carolina at Chapel Hill, UMI Order No. 9034744, p. 1-369, 1990.

\* cited by examiner

HAPTIC PROFILING SYSTEM AND METHOD

CROSS-REFERENCE TO RELATED APPLICATIONS

This application claims the benefit under 35 U.S.C. §119 (e) of U.S. Provisional Application Ser. No. 60/531,416, filed Dec. 19, 2003, entitled "Haptic Profiling System" and U.S. Provisional Application Ser. No. 60/551,054 filed Mar. 9, 2004, entitled "Haptic Profiling System and Method," both of which are incorporated herein by reference in their entirety.

BACKGROUND

The invention relates generally to haptic feedback devices. More specifically, the invention relates to a system and method for profiling mechanical devices to design haptic effects for haptic feedback devices.

Before the advent of computer aided design and engineering tools, such as computer-aided drafting/computer-aided engineering (CAD/CAE) tools, the iterative design and engineering process between supplier and an equipment manufacturer, such as an original equipment manufacturer (OE or OEM), was time consuming and costly. Suppliers would present drawings or prototypes and then receive feedback based on their presentation. The supplier would make design changes based on the feedback and then go through the same process again. After many iterative cycles, the final design would be completed. Depending on how well this relationship was managed between the OE and the supplier, the results could vary widely in quality and cost.

One drawback of the iterative process is the difficulty in communicating how a device feels to a supplier. Compounding the problem of getting a mechanical device (e.g., a switch) to feel as desired, is the issue of having the decision makers (e.g., customer and/or executives) on-hand to give their approval.

Some systems represent the feel of a mechanical device with a static torque/travel curve of the force profile. The force profile is given to a supplier in the form of engineering drawings. The device manufacturer then makes a design that attempts to match the desired force profile. This is an iterative process, as the required level of customer satisfaction is only achieved after several attempts by the supplier. Typically, a drop in performance and, correspondingly, in customer satisfaction occurs when moving from soft to hard tooling.

While many design processes have become partially or fully automated, many known processes used to design certain devices, such as mechanical switches, still require multiple iterations similar to those described above. For example, many known design processes used to create mechanical and/or haptic devices in the automotive industry require an iterative process similar to the one described above.

Thus, a need exists for improvements in systems and methods for profiling and designing haptic devices.

SUMMARY OF THE INVENTION

An apparatus is disclosed that includes a characterization module configured to receive data associated with operational characteristics of a mechanical device, the operational characteristics being associated with a perceptual experience of the mechanical device. A conversion module is coupled to the characterization module. The conversion module is configured to automatically produce, without user intervention, a parametric data set associated with the mechanical device based on the data.

In another embodiment, a method includes receiving data associated with operational characteristics of a mechanical device. The operational characteristics are associated with a perceptual experience of the mechanical device. A parametric data set associated with the mechanical device is produced automatically, without user intervention. The parametric data set is associated with the mechanical device based on the data.

DETAILED DESCRIPTION

An apparatus is disclosed that includes a characterization module configured to receive data associated with operational characteristics of a mechanical device, the operational characteristics being associated with a perceptual experience of the mechanical device. A conversion module is coupled to the characterization module. The conversion module is configured to automatically produce, without user intervention, a parametric data set associated with the mechanical device based on the data.

The systems and methods of the invention can be used to design outputs for haptic devices for a variety of applications and mechanical devices. For example, according to some embodiments of the invention, the systems and methods of the invention can be used to develop haptic devices (e.g., switches, knobs, etc.) for vehicles.

Figure 1:
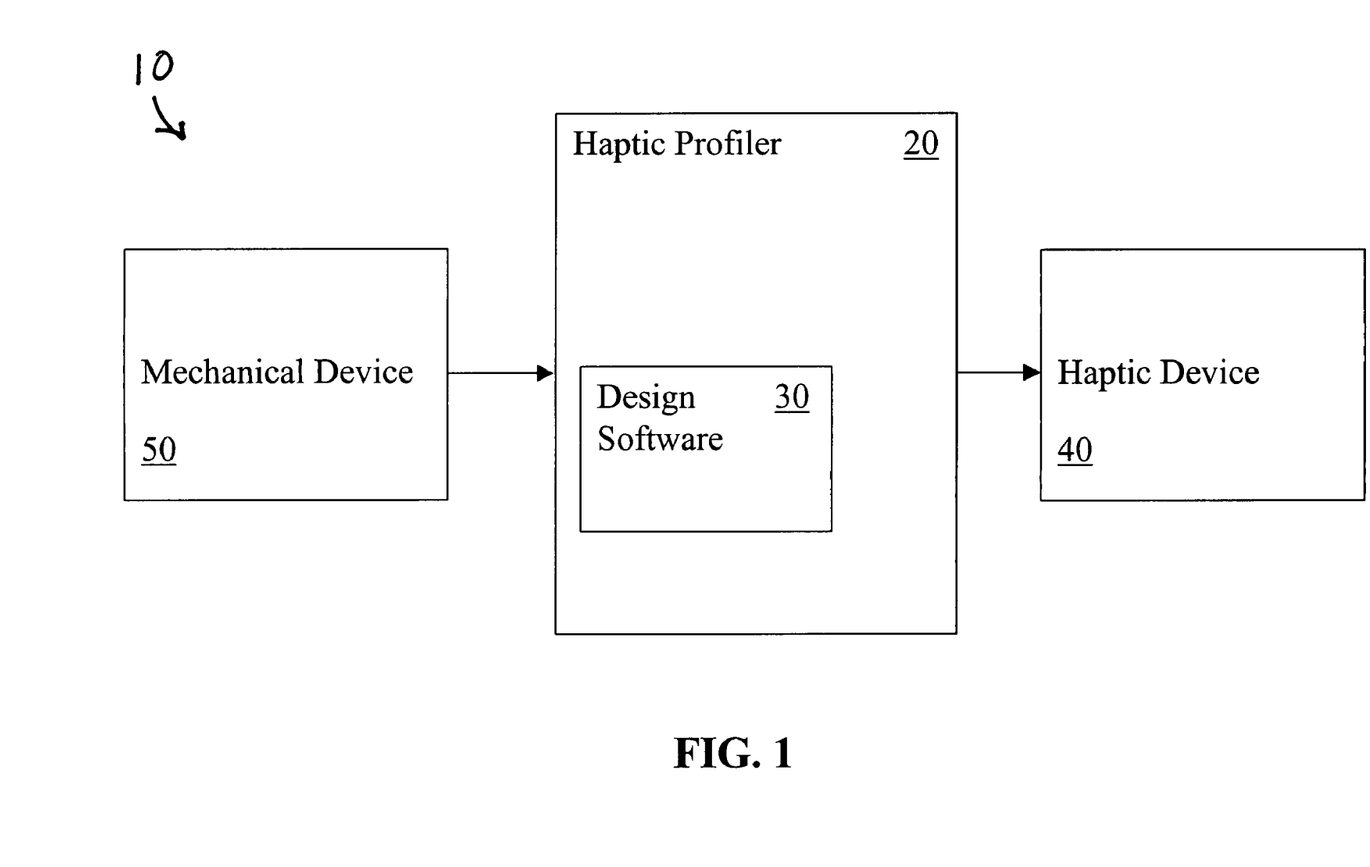
FIG. 1 is a schematic illustration of a haptic profiling system, according to an embodiment of the invention.

FIG. 1 is a schematic illustration of a haptic profiling system 10 coupled to a mechanical device 50. The haptic profiling system includes a haptic profiler 20 that receives data associated with operational characteristics of the mechanical device 50. The operational characteristics are associated with a perceptual experience of the mechanical device 50. The haptic profiler 20 converts the operational characteristics to a parametric data set and outputs a control signal to a haptic device 40 to cause the haptic device to output a haptic effect. The haptic device 40 reproduces the perceptual experience based on the measured data received from the mechanical device 50.

In some embodiments of the invention, the haptic profiling system includes a design module 30 that can be used to modify the data associated with the operational characteristics of the mechanical device 50. In other embodiments, the design module 30 is not present.

Figure 2:
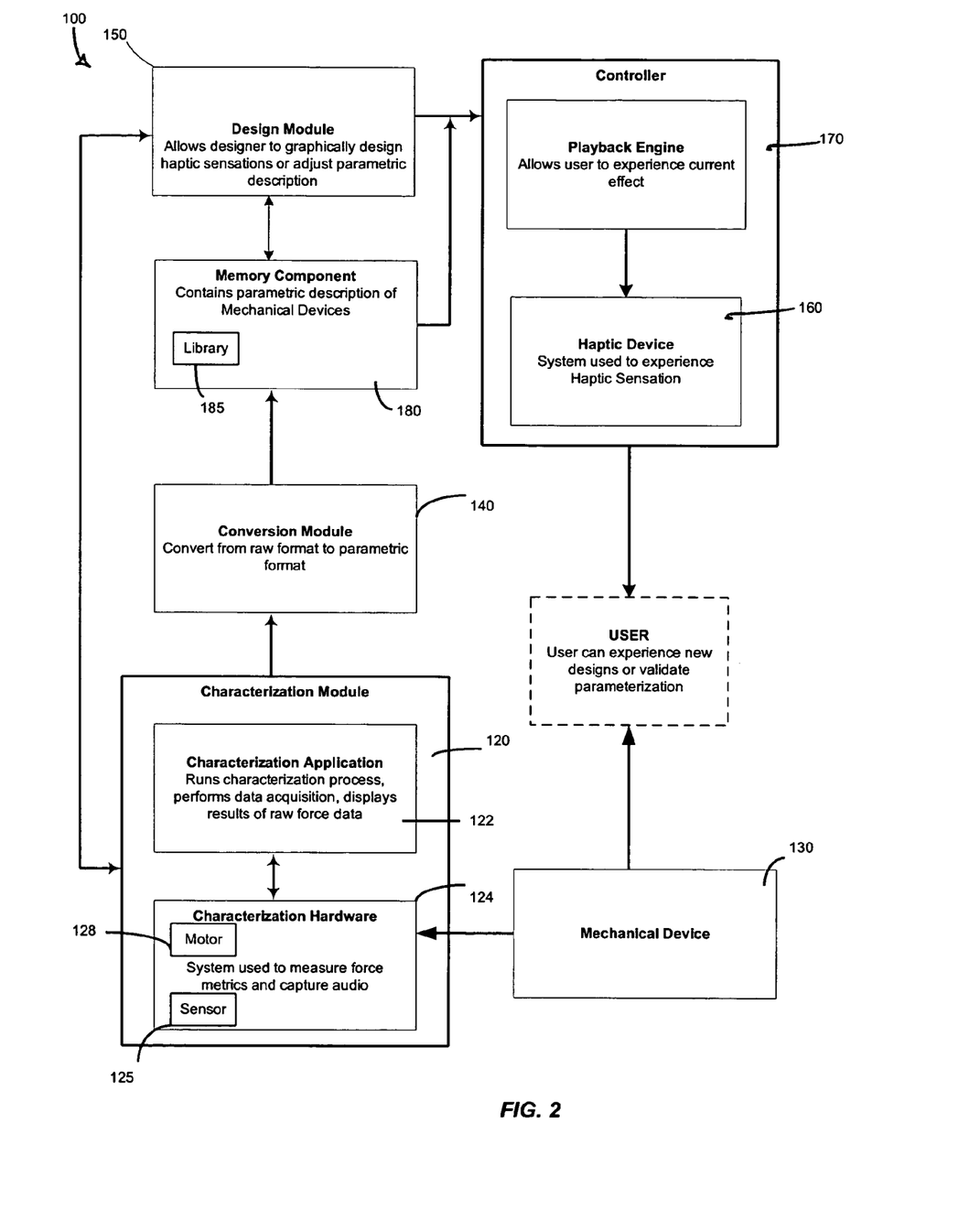
FIG. 2 is a schematic illustration of an implementation of a haptic profiling system, according to an embodiment of the invention.

An implementation of a haptic profiling system is schematically illustrated in FIG. 2. Haptic profiling system 100 includes a characterization module 120 that is configured to receive data associated with operational characteristics of a mechanical device 130. The operational characteristics of the mechanical device 130 are associated with a perceptual experience of the mechanical device 130.

The perceptual experience of mechanical device 130 is associated with the output (e.g., tactile output, audio output and/or visual output) of the mechanical device 130 as experienced by a user of the device or someone, not necessarily a user, in proximity of the mechanical device 130. The perceptual experience may be different for each user of the mechanical device 130. Additionally, the perceptual experience of the mechanical device 130 may vary over time and may vary based on operating conditions and operational modes of the mechanical device 130 as will be described in detail below.

The characterization module 120 includes characterization application software 122 and characterization hardware 124. The characterization application software 122 and characterization hardware 124 produce information to characterize the perceptual experience of the mechanical device 130 based on measurements of the mechanical device.

The characterization hardware 124 includes a sensor 125 and a motor 128. Sensor 125 outputs a measurement signal associated with the operational characteristics of mechanical device 130. When used to measure a mechanical device 130 having a rotary feature, such as a rotary switch, the motor 128 rotates the switch at given speeds and the sensor 125 samples, for example, angular positions. The raw data is output to the characterization application software 122. The characterization application software 122 generates data that substantially matches the operational characteristics of the mechanical device 130.

A conversion module 140 is coupled to the characterization module 120. The conversion module 140 receives the raw data and automatically produces a parametric data set associated with the mechanical device 130. The conversion module 140 generates the parametric data set based on a parametric analysis of the mechanical device 130. Parametric analysis is a design-optimization feature that allows the use of variables, rather than static values for specifying design parameters. For example, multiple dynamic measurements of the mechanical device are taken rather than snapshots of static measurements. The parametric data set removes some of the subjective nature from the process of evaluation of a representation of a mechanical device 130.

The operational characteristics associated with the perceptual experience of mechanical device 130 and the resulting parametric data set can be used to communicate to a haptic device 160 a signal configured to cause the haptic device 160 to output in a manner that corresponds to the desired perceptual experience. The output of the haptic device 160, for example, can be experienced by suppliers to evaluate prototype mechanical devices against initial specifications (i.e., as a comparison) to improve consistency of mechanical devices amongst multiple suppliers and to understand performance of switches within a user environment (e.g., a vehicle cockpit).

The parametric data set contains a set of metrics that quantify the reproduction of the feel or experience of mechanical device 130. The conversion module 140 can automatically produce the parametric data set without user intervention. In other words, measurements of the mechanical device 130 are taken and a signal associated with the operational characteristics is output in the form of a parametric data set substantially without human intervention. In other embodiments, the parametric data set can be created based on minimal user intervention. For example, user intervention may be required to initiate the generation of the parametric data set or complete the creation of the parametric data set.

The data associated with the plurality of operational characteristics of the mechanical device 130 can be analog data and/or digital data such as, for example, data indicative of a force profile, a peak force, a dead band parameter, a friction parameter, a symmetry parameter, a click location, a velocity dependence, a torque profile, a detent, a spring return, an audio parameter and other similar profiles. The data associated with the plurality of operational characteristics of the mechanical device 130 can also include, for example, audio data indicative of audio quality. The mechanical device 130 can be, for example, a knob or a switch, a trackball, a pushbutton, etc.

A controller 170 is in communication with the conversion module 140 and is configured to send a signal to haptic device 160 based on the parametric data set associated with the mechanical device 130. The signal is operative to output a haptic effect and/or an audio effect from the haptic device 160.

In some embodiments, a memory component 180 is in communication with the conversion module 140. The memory component 180 is configured to store the parametric data set associated with the mechanical device 130 in a library 185 having multiple parametric data sets. Each one of the parametric data sets are uniquely associated with a separate mechanical device. In addition, other parametric data sets not associated with a specific mechanical device can also be stored in the library 185. Such parametric data sets can be, for example, parametric data sets customized through user interaction described below in connection with design module 150.

The parametric data sets stored in the library 185 can be retrieved after they have been stored. To simplify the retrieval process, each parametric data set can be assigned various identifiers such as a unique name for the particular data set, the company for which the data set was produced, the date the data set was created, comments related to the operational characteristics, etc.

A digital parametric format allows for the creation of the library 185. The library 185 can be used to experience a number of different previously characterized mechanical devices 130 on one or more haptic devices 160. The design module 150 can be used to create new designs and store them in the library 185. In this manner, a complete suite of mechanical device designs can be made available online (e.g., via the Internet) or in some other manner.

Using the parametric data set(s) stored in the library 185, it is possible to automatically create or synthesize a matching force profile that will feel similar to the characterized mechanical device 130. For example, a haptic device 160 to be programmed can be in communication with the characterization module 120, allowing the evaluation of the quality of the programmed effect relative to the stored parametric data. The commands to the haptic rotary control can be altered to most closely match the perceptual experience measured directly from the mechanical device 130.

A file can be output to a design module 150 including a haptic effect design application (e.g., Immersion Studio available from Immersion Corporation, San Jose, Calif.). The haptic effect design application includes data to be used in haptic effect generation. The haptic effect design application can receive data in a specified format. For example, the design application can receive a general force profile with multiple control points (e.g., piece-wise linear); velocity dependent profiles, the ability to create audio feedback by playing back pre-recorded audio files or MIDI files (audio files can be triggered by events such as position in a detent, enter barrier, etc.); and/or real-time audio synthesis to accommodate the need for real time control of the sound of the mechanical device according to speed.

The haptic effect design module can be used, for example, to manually modify the parametric data set. The haptic effect design module employs the parametric data set of the mechanical device 130, which can be stored or communicated, and experienced by users at other site locations (e.g., remote locations).

In some embodiments, the design module 150 is in communication with the conversion module 140 and the controller 170. The design module 150 is configured to modify the parametric data set associated with the mechanical device 130 to produce a modified parametric data set as discussed above. The design module 150 compares the haptic effect to the operational characteristics of the mechanical device 130 to produce a comparison signal. The design module 150 can modify the parametric data set based at least partially on the comparison signal.

The design module 150 is configured to produce a user interface associated with the library 185. The design module 150 can send a signal based on at least one user command to select at least one parametric data set from the library 185 including multiple parametric data sets. The signal causes the haptic device 180 to output haptic feedback associated with the operational characteristics associated with the perceptual experience of the selected mechanical device 130.

Some embodiments are used in conjunction with programmable haptic devices 160 that allow a single input device to represent a number of different input functions or different operational modes of a mechanical device 130. For example, the same haptic device 160 can be used to mimic or simulate the feel of a car radio-tuning dial, the car fan dial, or thermostat control dial. The programmable haptic device 160 is configured to receive a control signal from the controller 170 to output the haptic feedback associated with the operational mode of the particular input function being controlled.

Figure 3:
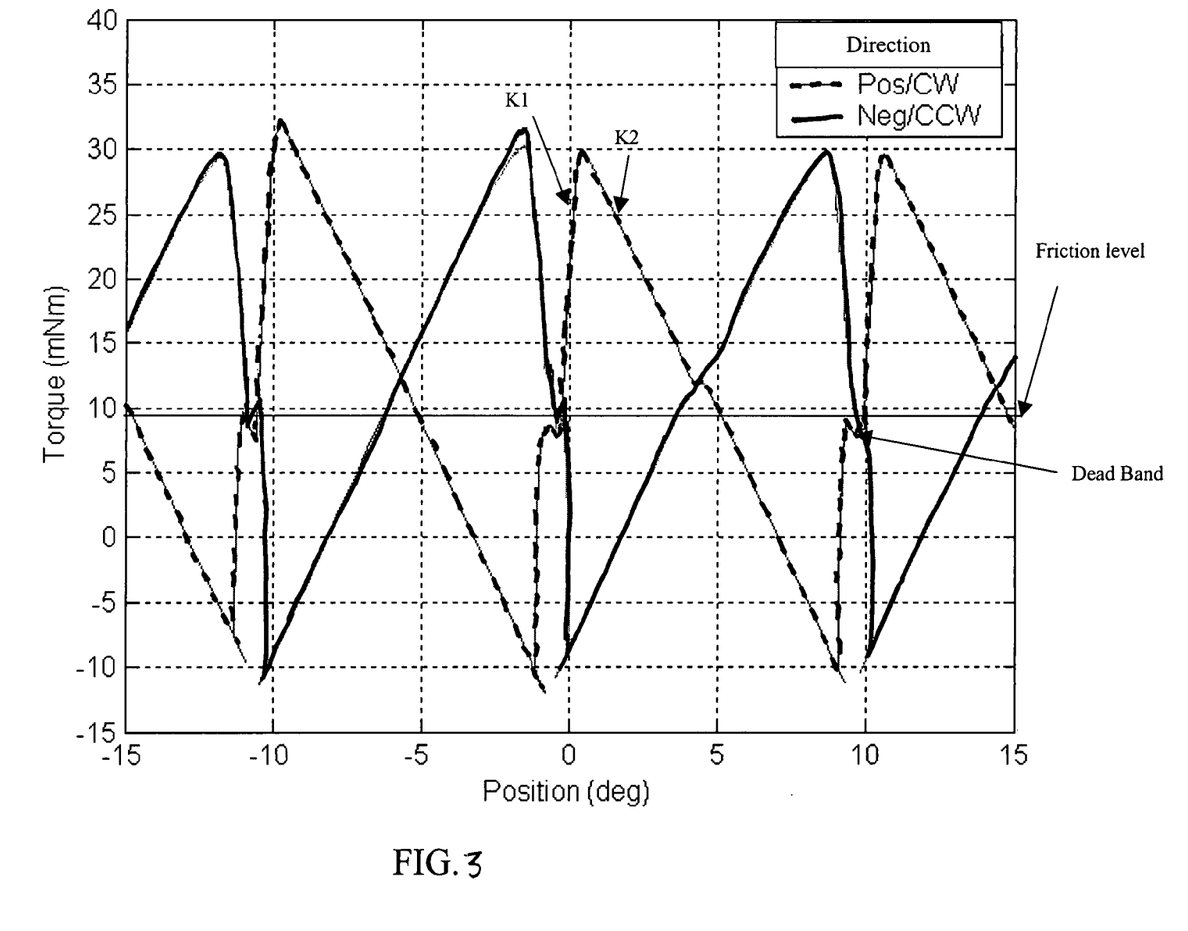
FIG. 3 is an example of a graphical representation of data associated with a plurality of operational characteristics of a mechanical device.

FIG. 3 is an example of a graphical representation of data associated with a plurality of operational characteristics of a mechanical device 130, such as a rotary knob. The dashed line in FIG. 3 is representative of the measurements of the operational characteristics of the knob as the knob is turned in the positive or clockwise direction. The solid line in FIG. 3 is representative of the measurements of the operational characteristics of the knob as the knob is turned in the negative or counter-clockwise direction. An example of a portion of a parametric data set associated with the operational characteristics shown in FIG. 3 is provided in Table 1 below. The parameters listed in Table 1 are examples of parameters for a particular rotary knob under a predefined set of circumstances.

TABLE 1

| Parameter | Value |
| --- | --- |
| Base Force profile | Triangular (Initial slope K1 = 26.3 mNm/deg, Trail-off slope K2 = −5.3 mNm/deg) |
| Number of detents | 30 per full revolution (12 degrees per detent) |
| Maximum force on detent | 22 mNm (milliNewton × meters) |
| Dead band | 0.5 degrees |
| Friction | 9 mNm (milliNewton × meters) |
| Symmetry | Symmetric |
| Click locations | None |
| Barriers | None (Continuous) |
| Velocity dependence | None |

In one embodiment, the motor 128 is controlled with a loop rate of at least 1 msec or lower. The minimum resolution of the signals output by the sensor 125 are 12-bit signals. These signals can include, for example, position sensor signals, current command to the motor, a torque sensor signal, and/or a sampling time. The signals provide, for example, 6 bytes of data associated with the mechanical device 130 per clock tick.

If the characterization module is run at 5 degrees/second as the slowest test speed possible, for example, and uses a sampling rate of 1 msec, the number of samples per one cycle of 360 degrees revolution is 72000 samples. With such a configuration, 6 bytes would be transferred every 1 msec from the characterization hardware 124 to the characterization application software 122.

The characterization hardware 124 that can be used with some embodiments may include, for example, a direct current (DC) motor with at least 100 mNm torque capability, a high performance brake (e.g., a magnetic particle brake) with at least 100 mNm torque capability, a high resolution sensor of at least 16000 counts per revolution (e.g., Agilent HEDS encoder; MicroE Systems encoder; and/or US Digital sensor). Torque sensors for use with the invention include, for example, 28000T(5-1) 0.353 Nm from www.himmelstein.com, plus accessories, torque signal conditional system and/or D-DR2494/M120 0.2 Nm from www.topac.com/LM-DR-2494.htm plus related accessories.

The characterization hardware 124, which can be in the form of a test bed, can contain both a high quality haptic device and a near-to-production haptic device. In this fashion the approximation of the perceptual experience of the haptic device can be assessed and the likely impact on production examined immediately. The reference test bed can also include loudspeakers to reproduce an audio response.

The characterization hardware 124 can be controlled by a variety of applications, which can be implemented using one or more controllers (e.g., an application specific integrated circuit ("ASIC"), an embedded controller, etc.). The characterization hardware could be controlled, for example, by a microcontroller unit (MCU). Four different architecture options for the characterization hardware 124, with corresponding components, are discussed below.

One embodiment of the architecture of the characterization hardware 124 is an microcontroller-based architecture. In some embodiments, the microcontroller board can include encoder ports, digital-to-analog (D/A) ports, pulse width modulation (PWM) ports, and universal serial bus (USB) ports. An amplifier is also coupled to the microcontroller board. The microcontroller board can include embedded programming to implement the controlling scheme, a state machine to transfer data to a host computer and/or a driver on the host computer programmed to send/receive data.

Another embodiment of the architecture of the characterization hardware 124 is an xPC based architecture. This architechture uses an xPC configuration and, according to an embodiment of the invention, can include an encoder, digital-to-analog (D/A) and analog-to-digital (A/D) boards and an amplifier. The characterization hardware 124 can also include an encoder board, a D/A board of at least 12 bits, a computer system with appropriate software (e.g., Matlab/Simulink/X Performance characterization (xPC) software), a current amplifier and a second computer to contain the boards and/or the controlling software.

Another embodiment of the architecture of the characterization hardware 124 is an PCI-Based I/O card architecture. This architecture can be integrated in the same computer used for a design studio application discussed above. According to an embodiment of the invention, the architecture can include an I/O peripheral component interconnect (PCI) board including an encoder reading port, A/D and D/A boards, and an 11 bits pulse width modulator. The architecture can further include a custom-made current amplifier to support the D/A or PWM signal and/or programming needed to implement the controller and identification schemes.

Another embodiment of the architecture of the characterization hardware 124 is a real-time workshop with an embedded solution. According to one or more embodiments, a digital signal processing (DSP) kit can be used that uses design and implementation of a controlling board. Other microcontrollers can also be used, which may not require the same amount of design and implementation. These other microcontrollers can, for example, support a way to transfer large amounts of data to the host computer. According to one or more embodiments, Matlab's real-time workshop (RTW) can be used to perform simulations and generate the embedded code for a DSP or micro-controller. For example, a real-time workshop can be used to make simulations and/or generate embedded code for a DSP or mico-controller board and/or a Micro-controller board, such as, for example, Texas Instruments DSP kit (including controlling board); Motorola DSP kit (including controlling board) and/or a Motorola HC12 micro-controller.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in art that various changes in form and details may be made therein without departing from the spirit and scope of the invention.

For example, while each parametric data set is described above as being associated with a single mechanical device, in alternative embodiments, multiple parametric data sets are associated with different operational modes of a single mechanical device.

While some embodiments have been described in the context of rotary switches, other devices, such as window-type toggle switches, levers, and push buttons, can also be characterized and/or simulated using the systems and methods of the invention.

It is possible to create a set of devices that can be attached to a test bed that could be used with the appropriate controllers to characterize other types of mechanical devices/switches. All components described herein as being implemented in software can be implemented in hardware, and all components described as being implemented in hardware can be implemented in software. The presently disclosed embodiments are, therefore, considered in all respects to be illustrative and not restrictive.

The invention claimed is:

1. An apparatus for haptically profiling a mechanical device, comprising:
   a characterization module configured to receive data associated with a plurality of operational characteristics of the mechanical device, the plurality of operational characteristics being associated with a perceptual experience of the mechanical device, wherein the data is received as input from the mechanical device, wherein the perceptual experience comprises a mechanically generated first tactile output that is experienced by a first user when interacting with the mechanical device;
   a conversion module coupled to the characterization module, the conversion module configured to automatically produce, substantially without user intervention, a parametric data set associated with the perceptual experience of the mechanical device based on the received data; and
   a controller that receives the parametric data set and outputs a signal based on the parametric data set to a programmable haptic device, wherein the signal causes the programmable haptic device to generate haptic effects;
   wherein the haptic effects simulate the perceptual experience of the mechanical device;
   wherein the simulation comprises generating a second tactile output that is experienced by a second user when interacting with the programmable haptic device, wherein the second tactile output is substantially similar to the mechanically generated first tactile output.

2. The apparatus of claim 1, wherein:
   the data associated with the plurality of operational characteristics of the mechanical device is at least one of analog data and digital data; and
   the parametric data set associated with the mechanical device is digital data.

3. The apparatus of claim 1, wherein the characterization module comprises a sensor for measuring the operational characteristics and a motor for generating the operational characteristics.

4. The apparatus of claim 1, further comprising:
   a design module in communication with the conversion module, the design module configured to modify the parametric data set associated with the mechanical device to produce a modified parametric data set; and
   the controller in communication with the conversion module and the design module, the controller configured to send a second signal based on the modified parametric data set, the second signal being configured to cause the haptic device to output a haptic effect.

5. The apparatus of claim 1, further comprising:
   a design module in communication with the conversion module, the design module configured to modify the parametric data set associated with the mechanical device to produce modified parametric data set; and
   the controller in communication with the conversion module and the design module, the controller configured to send a second signal based on the modified parametric data set, the second signal being operative to cause the haptic device to output a haptic effect, the design module configured to compare the haptic effect to the operational characteristics of the mechanical device to produce a comparison signal, the design module configured to modify the parametric data set associated with the mechanical device at least partially based on the comparison signal.

6. The apparatus of claim 1, further comprising: a memory component in communication with the conversion module, the memory component configured to store the parametric data set associated with the mechanical device in a library having a plurality of parametric data sets, each parametric data set from the plurality of parametric data sets being uniquely associated with one mechanical device from a plurality of mechanical devices.

7. The apparatus of claim 1, wherein the received data includes force profile data associated with operational characteristics of the mechanical device.

8. The apparatus of claim 1, wherein the received data includes audio data associated with the plurality of operational characteristics of the mechanical device, the audio data being indicative of audio quality, the apparatus further comprising:
   a design module in communication with the conversion module, the design module configured to modify the parametric data set associated with the mechanical device to produce a modified parametric data set; and the controller in communication with the conversion module and the design module, the controller configured to send a second signal based on the modified parametric data set, the second signal configured to cause the haptic device to output a haptic effect and an audio effect.

9. A method for haptically profiling a mechanical device, comprising:

receiving data associated with a plurality of operational characteristics of the mechanical device, the plurality of operational characteristics being associated with a perceptual experience of the mechanical device, wherein the data is received as input from the mechanical device, wherein the perceptual experience comprises a mechanically generated first tactile output first tactile output that is experienced by a first user when interacting with the mechanical device;

producing automatically, substantially without user intervention, a parametric data set associated with the mechanical device based on the received data; and a controller that receives the parametric data set and outputs a signal based on the parametric data set to a programmable haptic device, wherein the signal causes the programmable haptic device to generate haptic effects;

wherein the haptic effects simulate the perceptual experience of the mechanical device;

wherein the simulation comprises generating a second tactile output that is experienced by a second user when interacting with the programmable haptic device, wherein the second tactile output is substantially similar to the mechanically generated first tactile output.

10. The method of claim 9, wherein:

the data associated with the plurality of operational characteristics of the mechanical device is at least one of analog data and digital data; and the parametric data set associated with the mechanical device is digital data.

11. The method of claim 9, further comprising:

comparing the haptic effect to the plurality of operational characteristics of the mechanical device.

12. The method of claim 9, further comprising:

modifying the parametric data set associated with the mechanical device to produce a modified parametric data set.

13. The method of claim 9, further comprising:

comparing the haptic effect to the plurality of operational characteristics of the mechanical device;

modifying the parametric data set associated with the mechanical device based on the comparing; and repeating the sending, the comparing and the modifying until a difference between the haptic effect and the plurality of operational characteristics of the mechanical device is within a predetermined threshold.

14. The method of claim 9, further comprising:

storing the parametric data set associated with the mechanical device in a library having a plurality of parametric data sets, each parametric data set from the plurality of parametric data sets being uniquely associated with one mechanical device from a plurality of mechanical devices.

15. The method of claim 9, wherein the received data includes force profile data associated with the plurality of operational characteristics of the mechanical device.

16. The method of claim 9, wherein the received data includes audio data associated with the plurality of operational characteristics of the mechanical device.

17. An apparatus for haptically profiling a mechanical device, comprising:

a design module configured to produce a user interface associated with a library having a plurality of predefined parametric data sets, each parametric data set from the plurality of predefined parametric data sets being uniquely associated with a haptic output from a plurality of haptic outputs, where each parametric data set is based on input from the mechanical device;

a controller coupled to the design module;

the design module configured to send a first signal based on at least one user command from the user interface, the user command being indicative of at least one parametric data set from the plurality of predefined parametric data sets;

wherein the controller receives the at least one parametric data set and outputs a second signal based on the parametric data set to a programmable haptic device, wherein the second signal causes the programmable haptic device to generate haptic effects;

wherein the haptic effects simulate the perceptual experience of the mechanical device.

18. The apparatus of claim 17, wherein:

the plurality of operational characteristics associated with the mechanical device is based on a measurement of the mechanical user-input device, and the haptic output is operative to substantially simulate the plurality of operational characteristics of the mechanical device.

19. The apparatus of claim 17, further comprising a characterization module and a conversion module, wherein:

the characterization module includes a sensor in communication with the conversion module, the sensor being configured to provide a measurement signal associated with the plurality of operational characteristics associated with the perceptual experience of the mechanical device, the conversion module being configured to produce the respective parametric data set associated with the mechanical device based on the measurement signal, the respective parametric data set including at least two of a detent, a peak force, a dead band parameter, a friction parameter, a symmetry parameter, a click location, a velocity dependence, and an audio parameter.

20. The apparatus of claim 17, further comprising:

a characterization module including a sensor in communication with a conversion module, the sensor being configured to provide a measurement signal based on the haptic output by the haptic device, the conversion module configured to modify the at least one parametric data set associated with the at least one user command to produce a modified parametric data set based on the measurement signal, and the controller configured to send a signal based on the modified parametric data set and operative to cause the haptic device to output a haptic effect associated with the modified parametric data set.

21. The apparatus of claim 17, further comprising:

a characterization module configured to receive data associated with the plurality of operational characteristics of the mechanical device; and a conversion module in communication with the characterization module and the design module, the conversion module configured to automatically produce, without user intervention, the at least one parametric data set based on the data.

22. The apparatus of claim 17, further comprising:
a characterization module configured to receive data associated with the plurality of operational characteristics of the mechanical device; and
a conversion module in communication with the characterization module and the design module, the conversion module configured to automatically produce, without user intervention, the at least one parametric data set based on the data, the data associated with the plurality of operational characteristics of the mechanical device being at least one of analog data and digital data; and
the at least one parametric data set associated with the mechanical device being digital data.

23. A method for haptically profiling a mechanical device, comprising:
producing a user interface associated with a library having a plurality of predefined parametric data sets, each parametric data set from the plurality of predefined parametric data sets being uniquely associated with a haptic output from a plurality of haptic outputs, wherein each parametric data set is based on input from the mechanical device;
receiving a user command associated with the user interface; and
sending a test based on the user command and operative to cause a haptic device to output a haptic output associated with a plurality of operational characteristics associated with a perceptual experience of the mechanical device;
outputting a second signal from a controller coupled to the design module, wherein the controller receives the parametric data set and outputs the second signal based on the parametric data set to a programmable haptic device, wherein the second signal causes the programmable haptic device to generate haptic effects;
wherein the haptic effects simulate the perceptual experience of the mechanical device.

24. The method of claim 23, wherein:
the plurality of operational characteristics associated with the mechanical user-input device is based on a measurement of the mechanical device, and
the haptic output is operative to substantially simulate the plurality of operational characteristics of the mechanical device.

25. The method of claim 23, further comprising:
receiving a measurement signal associated with the plurality of operational characteristics of the mechanical device; and
producing data associated with the plurality of operational characteristics of the mechanical device based on the measurement signal, the plurality of operational characteristics including at least two of a detent, a peak force, a dead band parameter, a friction parameter, a symmetry parameter, a click location, a velocity dependence, and an audio parameter.

26. The method of claim 23, further comprising:
receiving a measurement signal based on the haptic output by the haptic device;
modifying the at least one parametric data set associated with the at least one user command to produce a modified parametric data set based on the measurement signal; and
sending a signal based on the modified parametric data set and being operative to cause the haptic device to output a haptic effect associated with the modified parametric data set.

27. The method of claim 23, further comprising:
receiving data associated with the plurality of operational characteristics of the mechanical device; and
automatically producing, without user intervention, the at least one parametric data set based on the data.

28. The method of claim 23, further comprising:
receiving data associated with the plurality of operational characteristics of the mechanical device; and
automatically producing, without user intervention, the at least one parametric data set based on the data,
the data associated with the plurality of operational characteristics of the mechanical device being at least one of analog data and digital data; and the at least one parametric data set associated with the mechanical device being digital data.

* * * * *